United States Patent
Cornelius et al.

(10) Patent No.: US 9,463,533 B2
(45) Date of Patent: Oct. 11, 2016

(54) PROCESS FOR SALVAGING TURBOCHARGER COMPRESSOR HOUSINGS

(75) Inventors: Gregory S. Cornelius, Peoria, IL (US); Gerald T. Otten, Jr., Washington, IL (US); Mark D. Veliz, Metamora, IL (US); Karen Renee Raab, Peoria, IL (US); David Alejandro Chairez Briones, Neuvo Laredo (MX); Luis Alonso Lugo Aviles, Dunlap, IL (US); Rathnam Venkatesh Basam, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1084 days.

(21) Appl. No.: 13/593,829

(22) Filed: Aug. 24, 2012

(65) Prior Publication Data

US 2014/0056699 A1 Feb. 27, 2014

(51) Int. Cl.
*B23P 6/00* (2006.01)
*B24B 5/40* (2006.01)

(52) U.S. Cl.
CPC .......... *B23P 6/00* (2013.01); *B23P 6/002* (2013.01); *B24B 5/40* (2013.01); *F05D 2230/80* (2013.01); *Y10T 29/4973* (2015.01); *Y10T 29/49238* (2015.01); *Y10T 29/49734* (2015.01)

(58) Field of Classification Search
CPC ............ B23P 6/00; B23P 6/002; B24B 5/40; F05D 2230/80; Y10T 29/49734; Y10T 29/4973; Y10T 29/4923
See application file for complete search history.

(56) References Cited

U.S. PATENT DOCUMENTS

| | | | | |
|---|---|---|---|---|
| 5,606,797 | A * | 3/1997 | Reynolds | B23P 6/00 29/402.08 |
| 7,140,106 | B1 | 11/2006 | Reynolds | |
| 7,334,799 | B2 | 2/2008 | O'Hara | |
| 2009/0013517 | A1* | 1/2009 | Benz | B23P 6/00 29/402.13 |
| 2009/0217523 | A1* | 9/2009 | Johnson | B23P 6/00 29/888.011 |
| 2010/0090419 | A1* | 4/2010 | Monden | B23B 31/16233 279/2.09 |

* cited by examiner

*Primary Examiner* — Sarang Afzali
*Assistant Examiner* — Ruth G Hidalgo-Hernande
(74) *Attorney, Agent, or Firm* — Miller, Matthias & Hull LLP (57) ABSTRACT

A method of salvaging a used, damaged turbocharger compressor housing involving the steps of machining the damaged interior surface of the housing, grit blasting the machined surface, building up the machined surface with coating material, and final machining the interior surface to its original specifications. The method includes holding the compressor housing by key datums during the machining steps.

19 Claims, 12 Drawing Sheets

PROCESS FOR SALVAGING TURBOCHARGER COMPRESSOR HOUSINGS

TECHNICAL FIELD OF THE DISCLOSURE

This disclosure relates generally to turbochargers, and, more particularly, to a method of salvaging the damaged compressor housing of a turbocharger so that it can be re-used.

BACKGROUND OF THE DISCLOSURE

The use of turbochargers to increase engine performance is well known. Simply put, turbochargers increase the mass of air supplied to an engine, resulting in improved engine performance.

A typical turbocharger comprises a turbine wheel connected to a compressor impeller by a rotatable shaft. Hot engine exhaust gas powers the turbine wheel which drives the compressor impeller. The compressor impeller draws in relatively cool ambient air and compresses it before it enters the engine intake manifold.

The compressor impeller is housed within a compressor housing, and the clearance between the compressor impeller and the housing is extremely small. Compressor impellers operate at very high speeds, often up to 90,000 RPM in large turbochargers used in some heavy duty vehicles and up to 250,000 RPM in automobiles. Over time the compressor impeller can contact the compressor housing and cause scratches or grooves, some over 1 mm deep, which can reduce turbocharger performance or, worse, cause turbocharger failure. Replacing the compressor housing with a new housing is expensive.

The present disclosure is directed toward solving one or more of the problems set forth above.

SUMMARY OF THE DISCLOSURE

In accordance with one aspect of the present disclosure, there is provided a method for salvaging a turbocharger compressor housing having a damaged interior surface. The compressor housing defines an axial line and comprises a body having an interior surface, a substantially cylindrical air inlet external port extending axially and forwardly from the body, a substantially cylindrical air inlet internal port extending axially and forwardly from the body and being substantially concentric with the air inlet external port, a compressed air outlet port extending roughly tangentially from the body and an annular ring extending substantially axially and rearwardly from the body. The air inlet internal port defines an internal diameter F. The annular ring has a substantially flat rear surface and a substantially cylindrical interior surface.

The method comprises the steps of (a) pre-spray machining the interior surface with a cutting tool to remove original base material, (b) pre-treating the machined portion by grit blasting to produce a grit blasted area, (c) spray coating the grit blasted area with a metalized coating to a depth exceeding operating specifications, and (d) final machining the interior surface to remove a portion of the metalized coating, thereby restoring the interior surface to the original operating specifications.

In the initial, pre-spray machining step, the compressor housing is mounted on a rotatable lathe and original base material is removed (cut away) from the interior surface to a substantially uniform depth by reaching through the air inlet internal port with a cutting tool while rotating the compressor housing.

In the final machining step the compressor housing is mounted to a lathe using a chuck having chuck jaws abutting the substantially flat rear surface and the substantially cylindrical interior surface of the annular ring. As in the pre-spray machining step, the interior surface is machined with a cutting tool inserted into the compressor housing through the air inlet internal port while the compressor housing is rotated about the axial line.

The disclosure further describes and claims a turbocharger compressor housing having an interior surface salvaged in accordance with the method described herein.

DETAILED DESCRIPTION OF THE DISCLOSURE

Definitions

In the description that follows and in the figures certain terms are used that will now be defined:

Datum A: The plane defined by the rear surface 46 of the compressor housing annular ring 44.

Datum C: The diameter of the internal surface 48 of the annular ring 44 located on the rear side of the compressor housing 20.

Dimension F: The internal diameter of the air inlet internal port 40 located on the front side of the compressor housing 20.

Dimension G: The axial center line of the compressor housing 20, calculated from the annular ring 44 and datums A and C.

Datum J: The outer diameter of the air inlet external port 38 located on the front side of the compressor housing 20.

Datum H: The plane defined by the front facing surface 39 of the air inlet external port 38.

Figure 1:
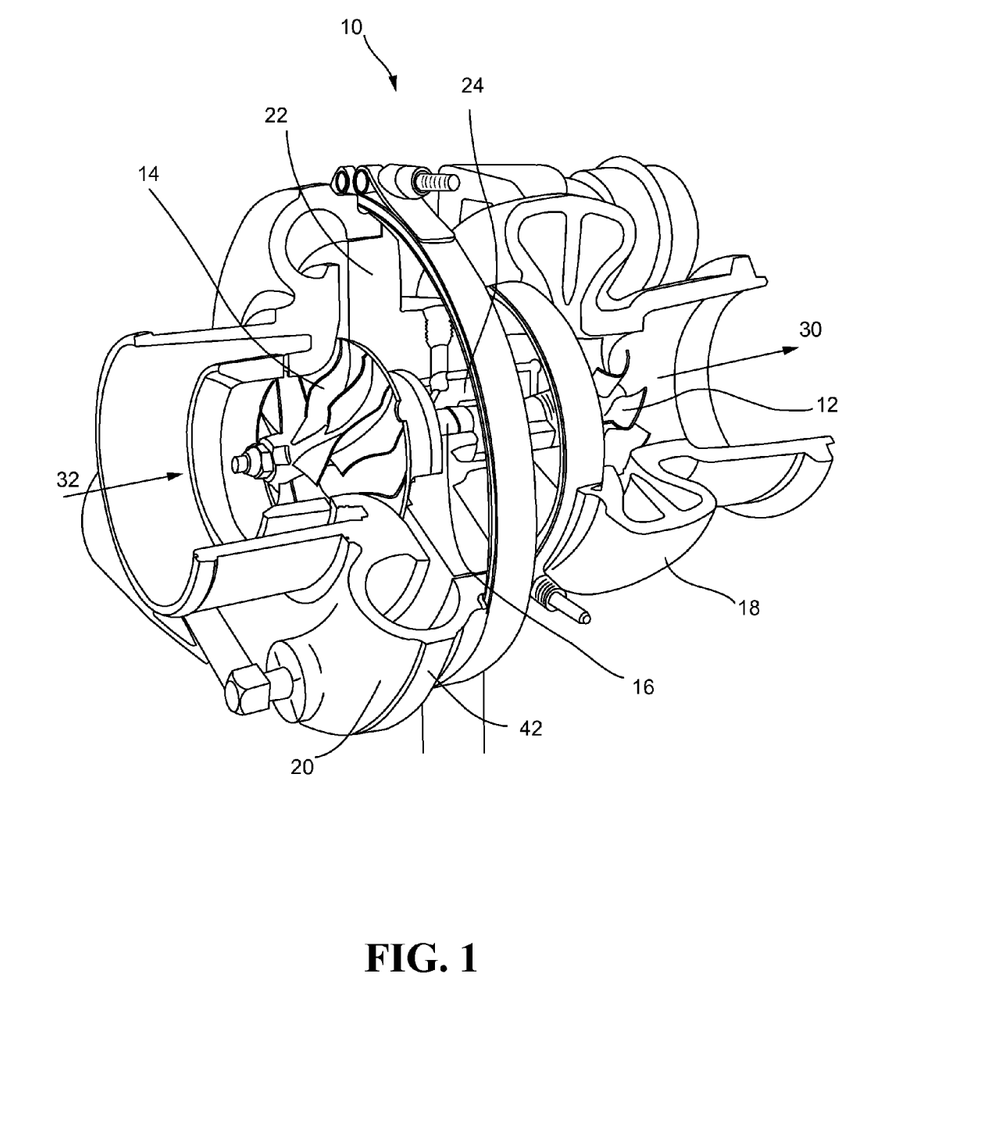
FIG. 1 is a partial cutaway perspective view of a turbocharger.

Turning to the drawings, there is shown in FIG. 1 a turbocharger for use with a heavy duty internal combustion engine. The turbocharger 10 comprises a turbine wheel 12 connected to a compressor impeller 14 by a rotatable shaft 16. The turbine wheel 12 is housed within a turbine housing 18. The compressor impeller 14 is housed within a compressor housing 20 which is mounted to a backplate 22. The compressor housing 20 may be made of aluminum, aluminum alloy, cast iron or any other suitable material. A bearing or center housing 24 located between the turbine housing 18 and the compressor housing 20 houses the rotatable shaft 16.

During operation, hot engine exhaust gas rotates the turbine wheel 12 before exiting the turbine housing 18 as turbine exhaust gas 30. The rotation of the turbine wheel 12 drives the rotatable shaft 16 which drives the compressor impeller 14. The rotating compressor impeller 14 draws in relatively cool ambient air 32 and expels compressed air into the engine intake manifold (not shown).

Figure 2:
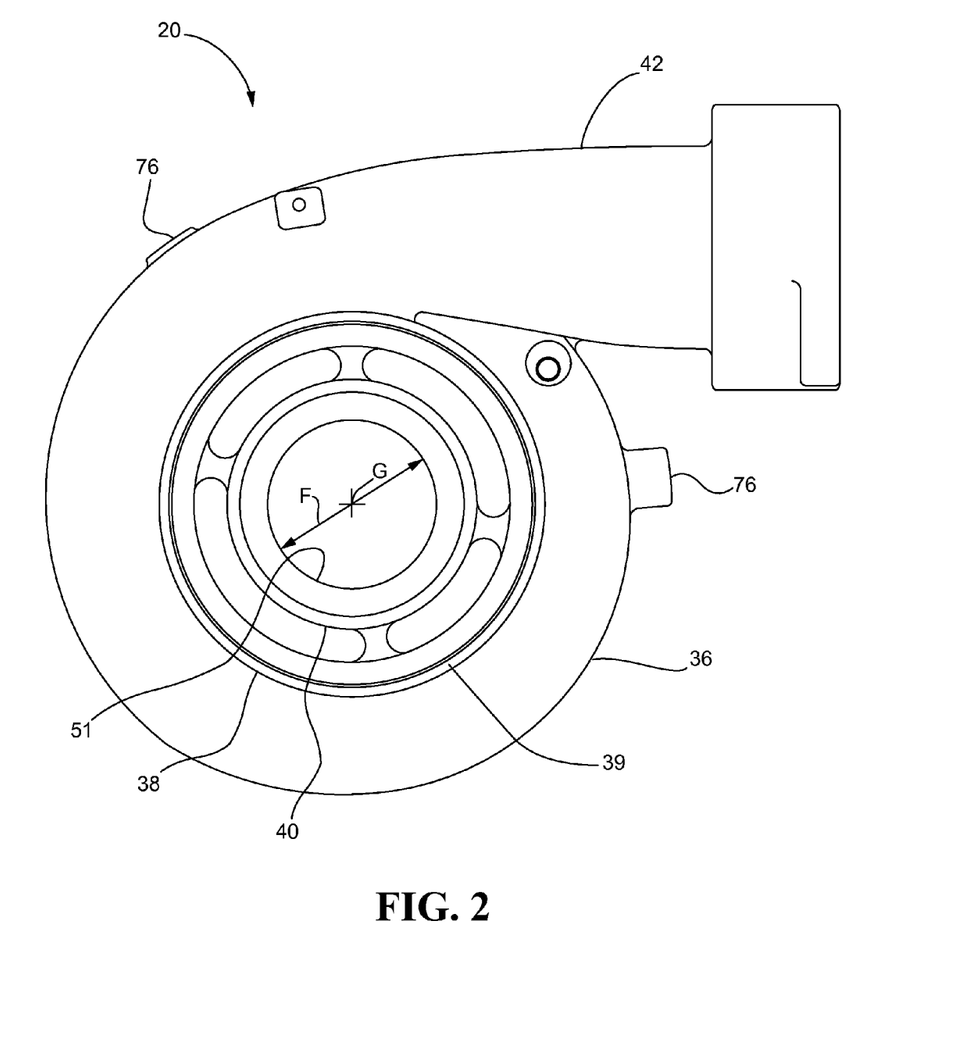
FIG. 2 is a front view of a turbocharger compressor housing.
Figure 3:
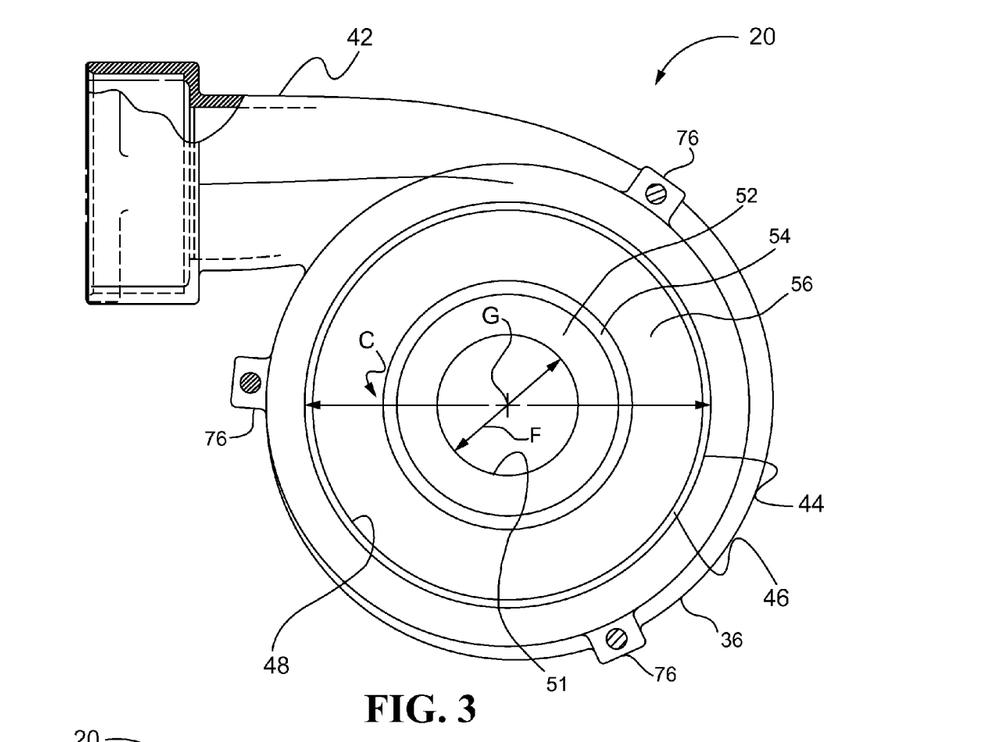
FIG. 3 is a rear view of the compressor housing of FIG. 2.
Figure 4:
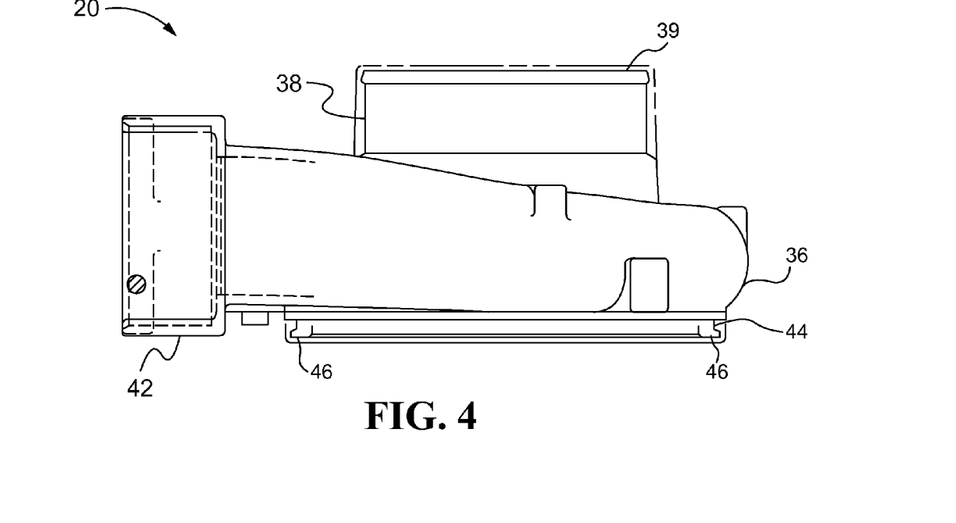
FIG. 4 is a top view of the compressor housing of FIG. 2.
Figure 5:
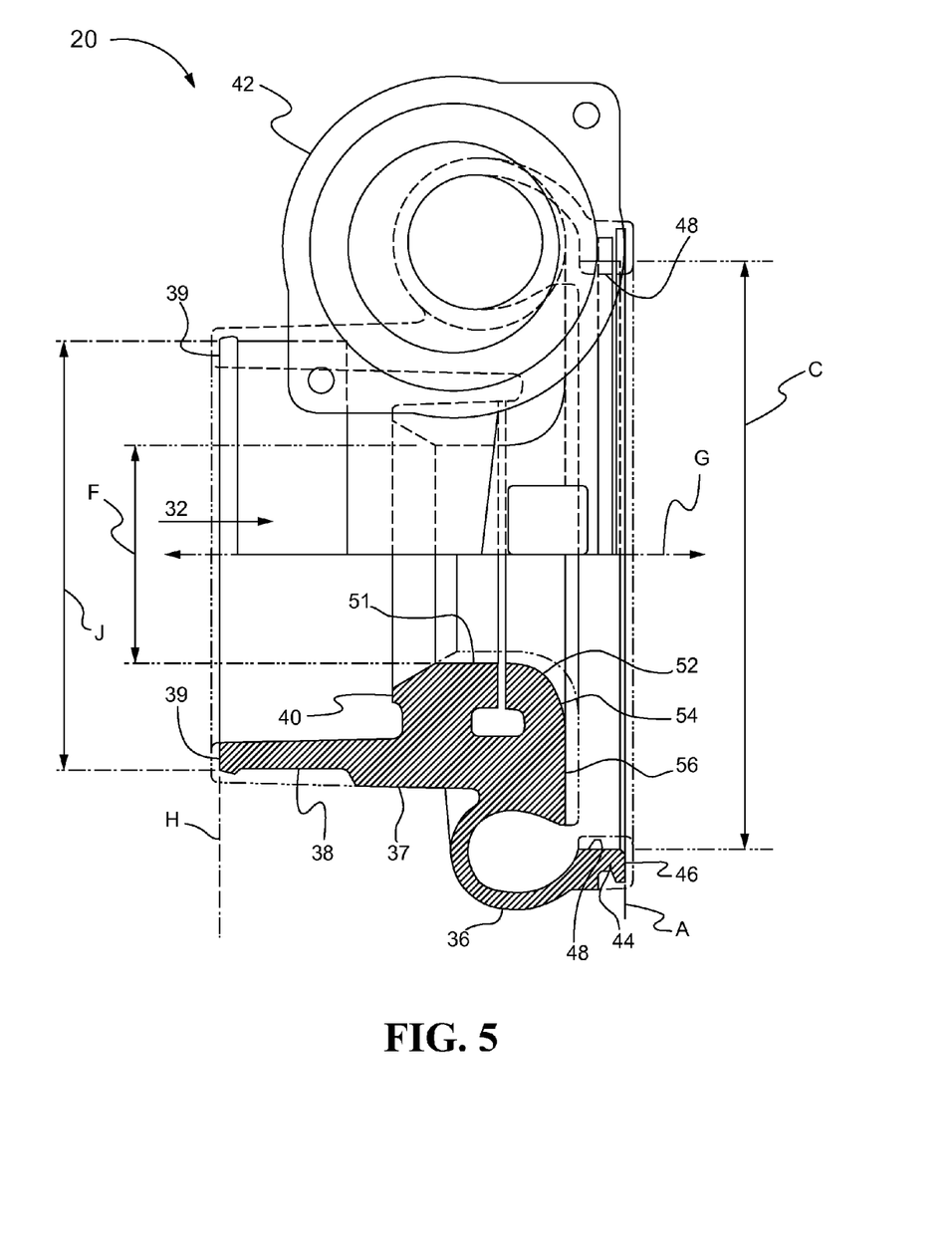
FIG. 5 is a partial cross sectional view of the compressor housing of FIG. 2 taken along line 5-5.

The structure and geometry of the compressor housing 20 will now be described with reference to FIGS. 2 to 6. FIGS. 2 and 3 are front and rear views respectively of a compressor housing 20 and FIG. 4 is a top view. FIG. 5 is a partial cross sectional view of the compressor housing taken along line 5-5 of FIG. 2.

The compressor housing 20 comprises a body 36, a substantially cylindrical air inlet external port 38 extending axially and forwardly from the body 36, and a smaller diameter, substantially cylindrical air inlet internal port 40 concentric with the air inlet external port 38 and having an inner diameter or bore F. As perhaps best shown in FIG. 5, the air inlet external port 38 and air inlet internal port 40 are both centered around the axial center line G. The air inlet external port 38—datum J—has a substantially planar front facing surface 39 that defines datum H and an outer cylindrical surface 37.

The compressor housing 20 further comprises a compressed air outlet port 42 extending roughly tangentially from the body 36, and an annular ring 44 extending substantially axially and rearwardly from the body 36. The annular ring 44 has a flat rear surface 46 that defines datum A and a cylindrical, annular interior surface 48 that defines datum C. As explained below, datum A and datum C are used to position the compressor housing 20 on a chuck prior to machining.

The annular ring 44 is established at the time of manufacture and, as just mentioned, during the salvaging process to determine the axial center line G of the compressor housing 20. When installed in a turbocharger 10, the flat rear surface 46 of the annular ring 44 mates with the turbocharger backplate 22.

The compressor housing 20 also comprises tabs 76 circumferentially arranged and extending radially outward from the compressor housing body 36. These tabs 76 act as locators during the initial machining of a new compressor housing 20. After a compressor housing 20 is rough cast, the housing 20 is mounted on the tabs 76 so that the air inlet external port 38 and air inlet internal port 40, including the H and J datums, can be machined to their final specifications. Then the housing 20 is moved to another lathe where it is turned over and clamped to the lathe on the H and J datums so that the geometry on the rear (mounting) side can be cut, including the A and C datums.

As a result of this manufacturing process, the tolerance between the H and J datums is fairly precise because they are machined while the housing is mounted on the same lathe under the same set up. Similarly, the tolerance between the A and C datums is fairly precise. However, the tolerance of the A and C datums with respect to the H and J datums is about 2.5 times that of the tolerance between the A and C datums themselves. For example, while the tolerance between the A and C datums is generally about 0.05 mm, their tolerance with respect to the H and J datums can be about 0.13 mm, or about two and a half times as great.

As a consequence of this manufacturing process, mounting a used compressor housing 20 on the H and J datums, i.e., the front side of the compressor housing 20, for salvaging purposes results in unacceptable tolerances on the compressor housing interior surface 50. In other words, although the method of machining the interior surface 50 of the compressor housing 30 while the housing 20 is mounted by the H and J datums is acceptable for making new compressor housings 20, it is unacceptable for salvaging used housings 20.

Figure 6:
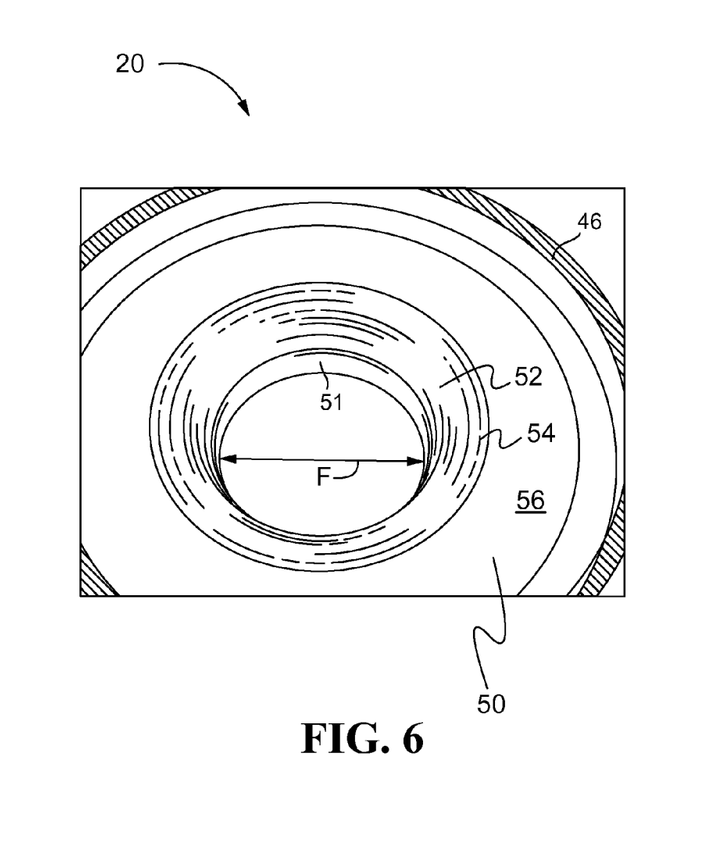
FIG. 6 is a rear perspective view of a new compressor housing.

FIG. 6 is a perspective view of the interior surface 50 of a new compressor housing 20. The compressor housing 20 has been removed from the backplate 22 and rests on its air inlet external port 38 with its rear side, including annular ring 46, facing up, exposing the interior surface 50 of the compressor housing body 36. Starting at the front end, the interior surface 50 comprises a substantially cylindrical surface 51, a contoured (curved) surface 52, a transitional band 54 and a relatively flat surface 56.

Referring to FIGS. 5 and 6, the substantially cylindrical surface 51 is located along the inside wall of the air inlet internal port 40, and extends from the near the front (i.e., the air intake end) of the air inlet internal port 40 to the contoured surface 52. The contoured surface 52 is bell shaped and is symmetrical around the axial center line G. The transitional band 54 is located between the contoured surface 52 and the relatively flat surface 56. The relatively flat surface 56 is substantially perpendicular to the axial center line G.

In a critical aspect of turbocharger operation, the clearance between the compressor impeller 14 and the compressor housing 20 is extremely small. Over time the impeller 14 may contact the housing 20 and cause scratches, grooves or other surface imperfections up to one millimeter or more in depth, which can reduce the turbocharger performance, and thus reduce engine performance or, worse, cause turbocharger failure.

Figure 7:
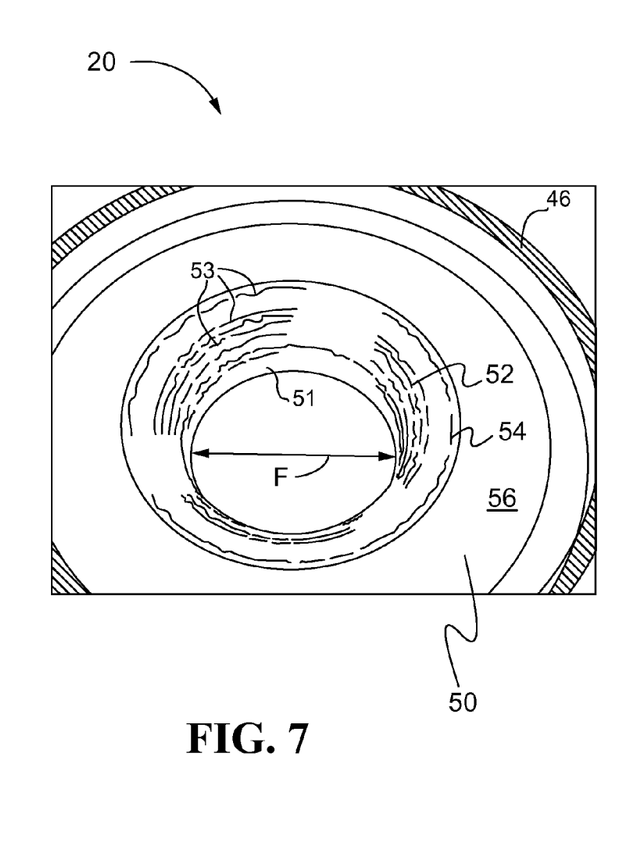
FIG. 7 is a rear perspective view of a used compressor housing with a damaged interior surface.

FIG. 7 is a perspective view of the interior surface 50 of a used compressor housing 20. Surface imperfections 53 appear on the contoured surface 52, which faces the turbocharger impeller 14 and has been damaged by contact with the impeller 14. The transitional band 54 and flat surface 56 are not subject to damage from the impeller 14 because they are located outside the diameter of the impeller 14.

A method has been developed to salvage used compressor housings 20 by removing the surface imperfections 53. At its most basic level, the method involves mounting the used compressor housing 20 on its rear side—using the A and C datums—and then repairing the damaged interior surface 52 using a cutting tool inserted through the air inlet port 40, as explained in more detail below.

Before repairing the damaged interior surface 52 of a used turbocharger compressor housing 20, the housing 20 may be cleaned and visually or otherwise inspected for damage. If the interior surface 52 is not too damaged, the housing 20 can be reused. If the interior surface 52 is damaged, then the housing 20 must be salvaged before it can be re-used. The method of salvaging a used turbocharger compressor housing 20 may comprise the following steps.

Figure 8:
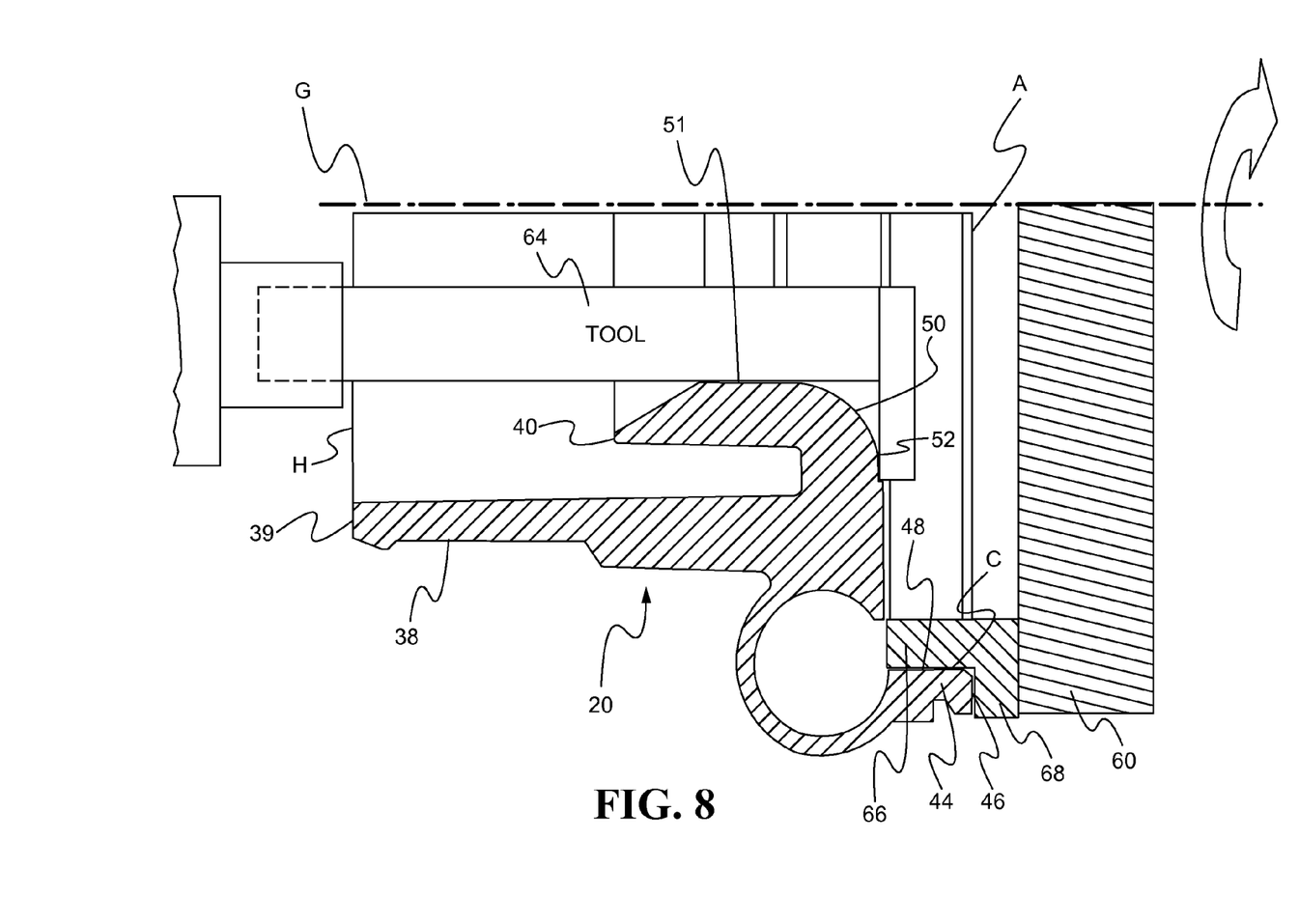
FIG. 8 is a stylized cross sectional view of a used compressor housing mounted on a lathe turret during a pre-spray machining step.

Step 1 (Pre-Spray Machining). In a pre-spray machining step, a layer of base material is removed from the interior surface 50 of the compressor housing 20. FIG. 8 is a stylized cross sectional view of a used compressor housing 20 during the pre-spray machining step. As the compressor housing 20 is rotated on a lathe or other apparatus, a cutting tool 64 is used to remove original base material from the damaged contoured surface 52 to a uniform depth. The cutting tool 64 is inserted through the front (air inlet) side during this step. The amount of material removed may be from about 0.4 mm to about 1 mm in depth.

The compressor housing 20 is held by a diaphragm chuck 68 mounted on a lathe turret 60, with the housing's front facing surface 39 facing the tool holder during the pre-spray machining. As explained below, preferably the compressor housing 20 is mounted on a diaphragm chuck 68 having enlarged, pie shaped chuck jaws 74 that contact both the rear surface 46 and the interior surface 48 of the annular ring 44, like the diaphragm chuck 68 shown in FIG. 14. Because of the eccentric geometry of the housing outlet (due primarily to the large outlet port 42), a counterweight 62 like that shown in FIG. 12 may be affixed to the diaphragm chuck 68 during the pre-spray machining step.

As noted above, the rear surface 46 and the interior surface 48 of the annular ring 44 represent datum A and datum C respectively. With the diaphragm chuck 68 firmly seated against datum A and datum C, these two datums determine the geometry for all the features on the inside and outside of the compressor housing 20 during this pre-spray machining step.

Figure 9:
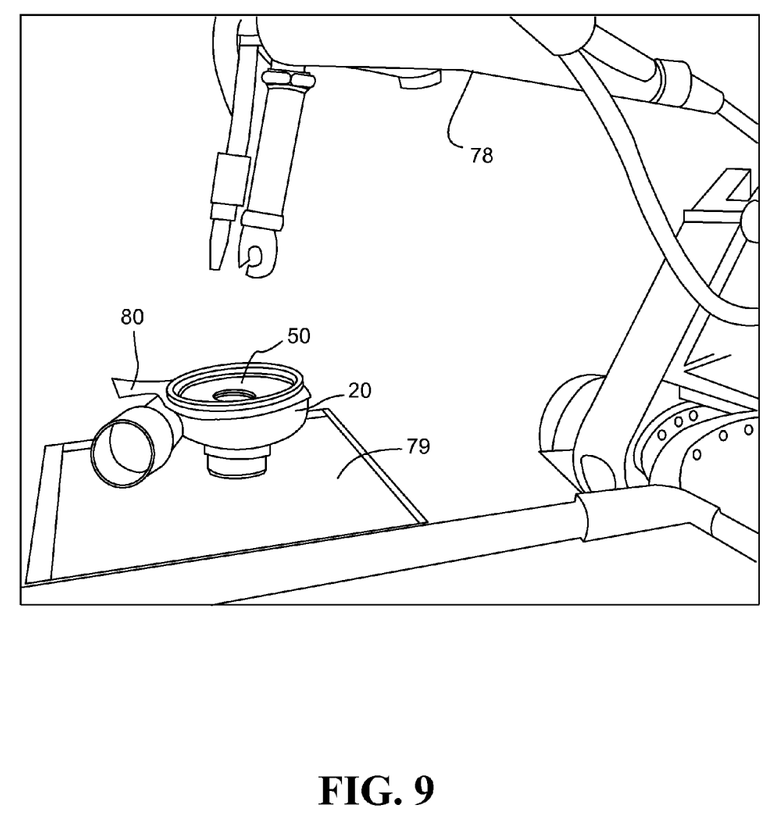
FIG. 9 is a schematic of a grit blasting cell.

Step 2 (Pre-treatment/Grit blasting). The layer of material removed from the contoured surface 52 during the pre-spray machining step 1 must be replaced with a new layer of material, but first the machined out contoured surface 52 must be pre-treated to enhance spray coating adhesion. This may be done by grit blasting. FIG. 9 shows a compressor housing 20 being grit blasted in preparation for step 3, spray coating. The compressor housing 20 is moved from the lathe used during the pre-spray machining step 1 to a grit blasting cell where the machined area can be grit blasted by a robotic blasting machine 78 to within acceptable roughness parameters. During the grit blasting step, the compressor housing 20 may be mounted on a table 79 rear side up, exposing the interior surface 50, so that an abrasive media can be directed at machined portion of the interior surface 50 from the rear (annular ring 44) side. Portions of the compressor housing interior that are not meant to be blasted may be masked off with a masking medium 80.

Step 3 (Spray coating). With the machined area now ready for spray coating, the compressor housing 20 is moved to a spray station 88 like that shown schematically in FIG. 10. Here the compressor housing interior surface 50 where material was removed during the pre-spray machining step is built back up with a metalized coating to a level in excess of the final tolerances.

The spray coating step may be accomplished using any suitable technology, including thermal spray technology. A wire arc spray process is preferred over simple spraying because it provides better adherence of the new material to the surface and because it can provide a thicker layer of coating.

Figure 10:
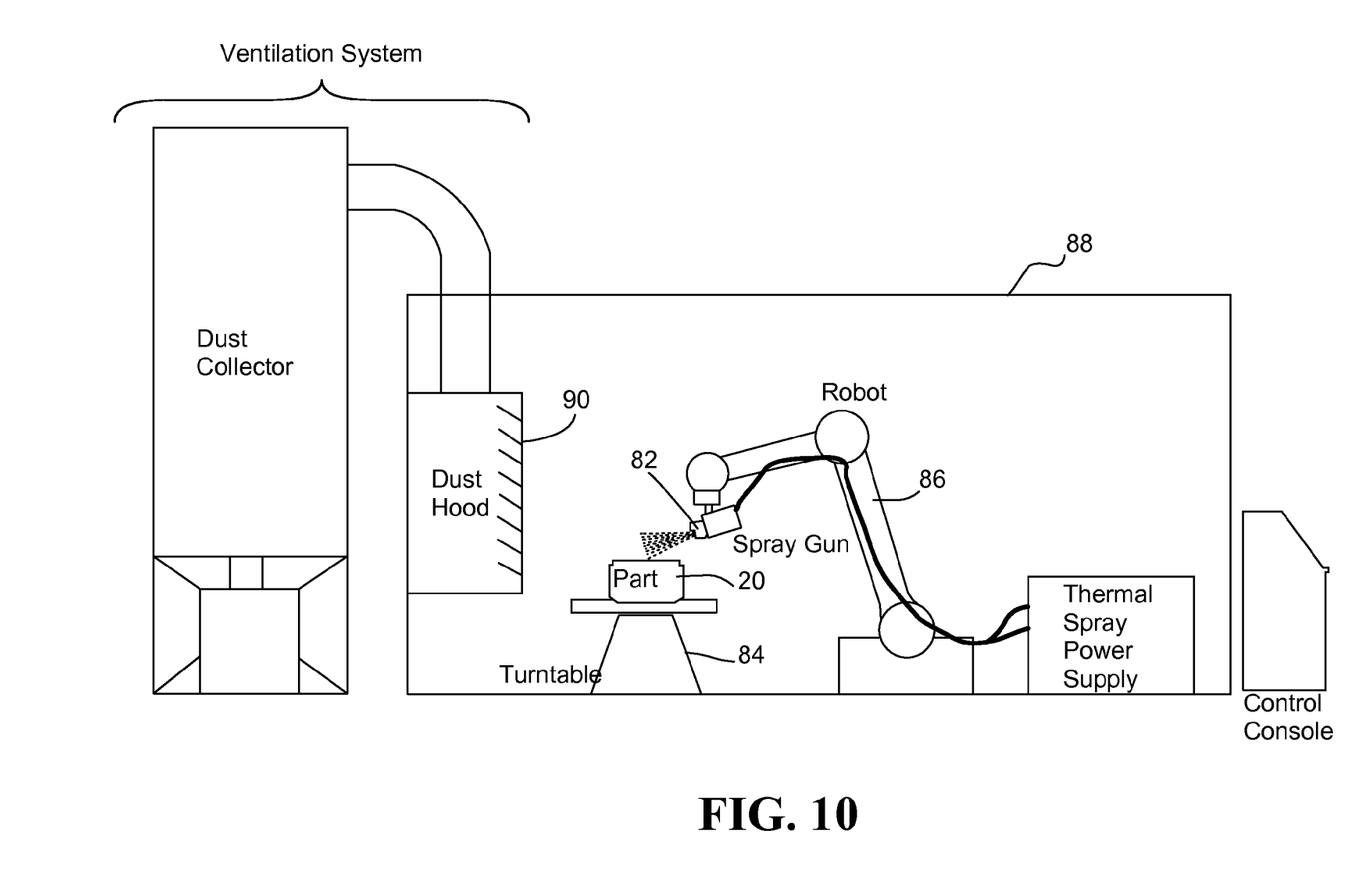
FIG. 10 is a schematic of a spray cell.

The compressor housing 20 may be chuck mounted on a rotatable horizontal turntable 84 during this step with the rear side (annular ring 44 side) up, exposing the interior surface 50. Masking 80 again may be used to keep the spray coating from adhering to surfaces for which it is not intended. A wire arc spray gun 82 may be carried by a robotic arm 86 which runs through a pattern of spraying while the compressor housing 20 is spinning on the turntable 84 to apply an even coat of material. Preferably the spray station is an enclosure equipped with a dust hood 90.

Figure 11:
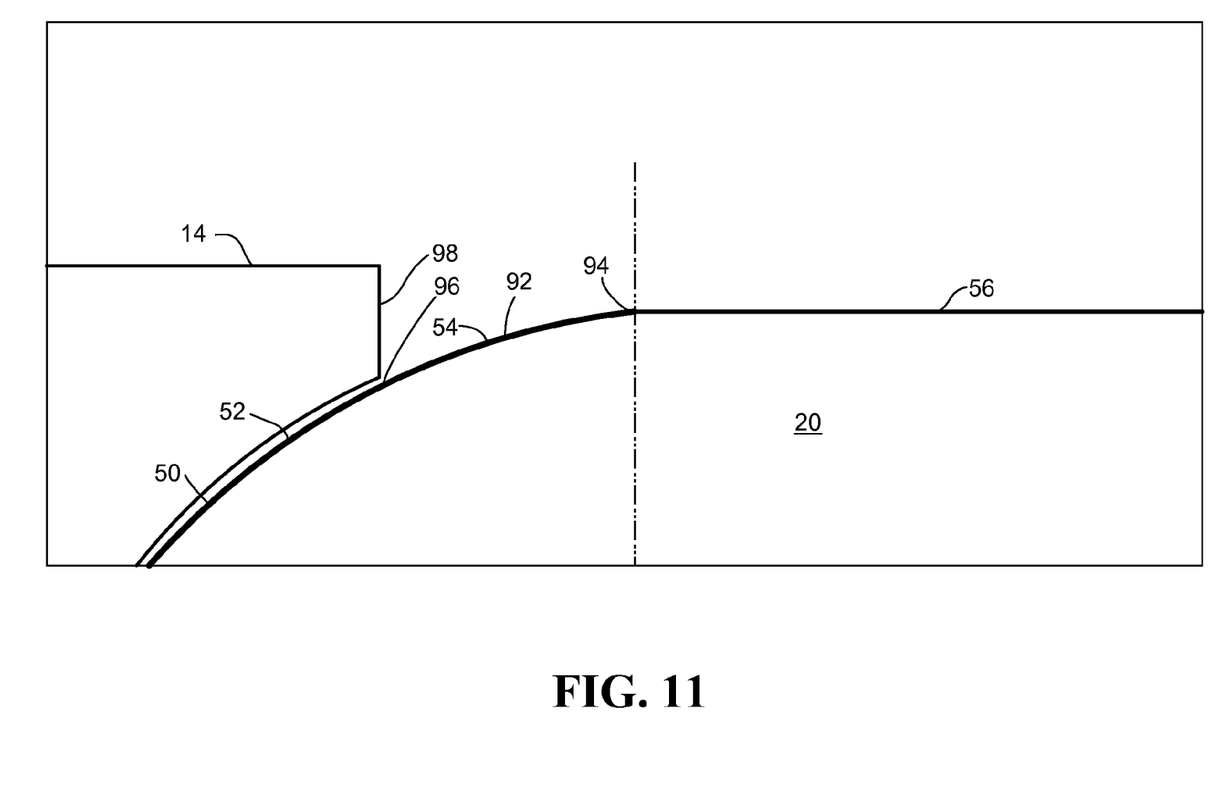
FIG. 11 is a cross sectional view of turbocharger compressor housing and compressor wheel.

FIG. 11 is a cross sectional view of a turbocharger compressor housing 20 and turbine wheel 12, illustrating the width of the area to be coated. The coating may start at a first annular ring 92 located in the contoured portion 52 of the housing interior surface 50 outside of where the outer diametric edge 98 of the turbine wheel 12 intersects the contoured surface 52. For example, the coating may start at a first annular ring 92 located in the contoured portion 52 of the housing interior surface 50 about halfway between a second ring 94, where the relatively flat surface 56 meets the transitional band 54, and a third ring 96, where a cylinder defined by the outer diametric edge 98 of the compressor wheel would intersect the contoured surface 52. From the first ring 92 the coating may extend downward along the contoured surface 52 away from the flat surface 56 and toward the air compressor internal port 40 to the area where the turbine wheel 12 no longer impacts (damages) the contoured surface 52.

The interior surface on which the coating has been laid down will have a relatively rough surface that needs to be smoothed out. Accordingly, excessive coating—at least 0.25 mm thicker than the operating specifications—is applied to the compressor housing interior surface 50 to allow removal of some of the coating during a final machining step to restore the compressor housing 20 back to print specifications.

Step 4 (Final machining). The final machining step restores the housing 20 to its original print (operating) specifications. After the spray coating step the compressor housing 20 may be re-mounted to the same lathe chuck used during the pre-spray machining step 1 for the final machining step, again using datums A and C.

Figure 12:
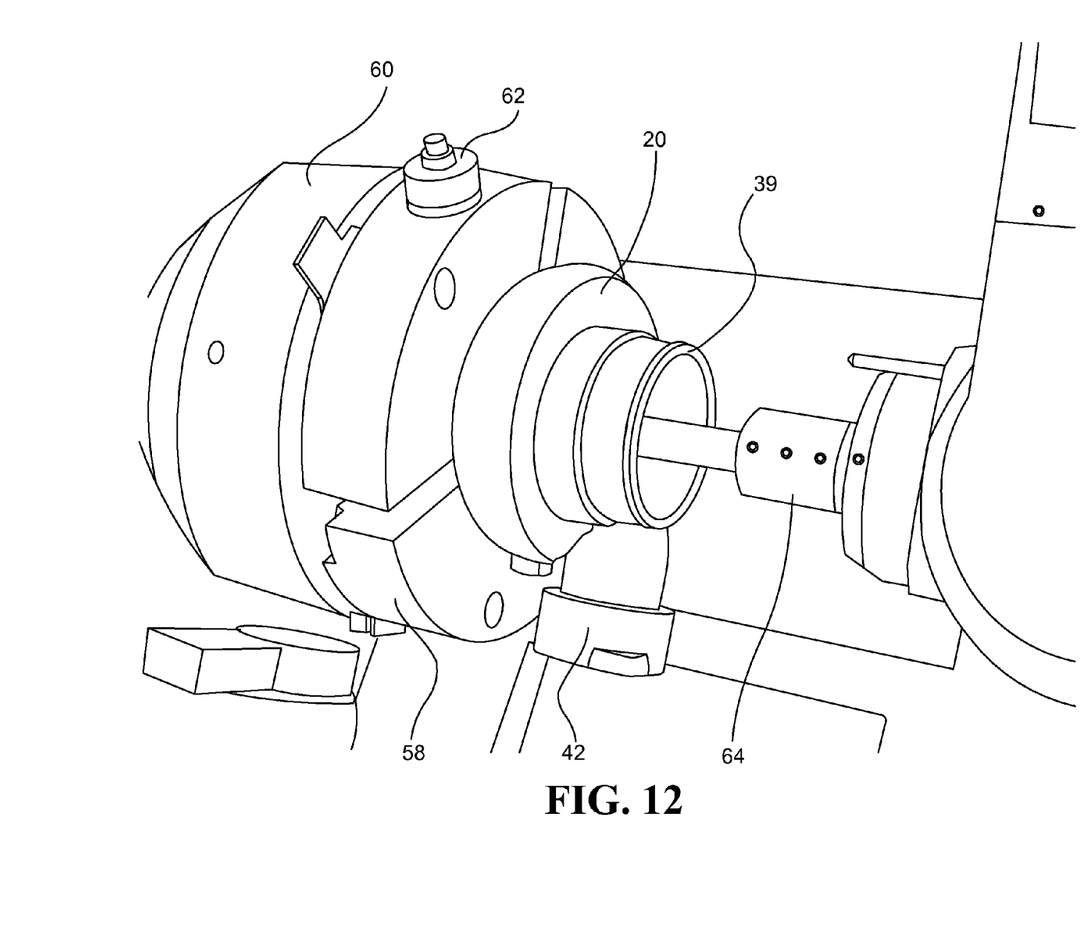
FIG. 12 is a perspective view of a compressor housing mounted on a chuck having three pie-shaped jaws during a final machining step.

FIG. 12 is a perspective view of a compressor housing 20 held by a chuck 58 mounted on a lathe turret 60, with the housing's front facing surface 39 facing up in preparation for pre-spray machining, an arrangement similar to that used during the pre-spray machining step 1. The chuck 58 shown in FIG. 12 is a three jaw chuck 58, each jaw covering an arc of almost 120 degrees and movable in the radial direction. However, as with the pre-spray machining step, preferably the compressor housing 20 is held by a diaphragm chuck 68, one having enlarged, pie shaped chuck jaws 74 that move both upwardly and outwardly to contact both the rear surface 46 and the interior surface 48 of the annular ring 44, like that shown in FIG. 14. Because of the eccentric geometry of the housing outlet (due primarily to the large outlet port 42), a counterweight 62 may be affixed to the chuck during the final machining step.

The cutting machine 64 may be calibrated using a special set up compressor housing (not shown) as a template to set the A and C datums before being used to machine a used compressor housing 20 or, as is more likely in practice, a batch of used housings 20. As in the pre-spray machining step, the cutting machine 64 is inserted through the front (air inlet) side. The cutting tool 64 may be replaced with a slotting tool (not shown) to recut the slots located in the compressor housing 20, if any.

Since the spray coating can be prone to cracking, the final machining step must be done carefully. Preferably, a layer only about 0.05 mm thick is machined off during each pass. In addition to machining the contoured surface 52, machining of the transitional band 54 may be performed to prevent any loose material, such as grit or spray material laid down during the previous steps, from being blown off of the internal surface 50 of the turbocharger housing 20 into the air intake of the engine.

Preferably the final machining operation is done on a rotating lathe and is conducted at constant surface speed. As the cutting machine 64 moves further away from the center line of the rotational axis, the rotational speed of the chuck 68 is reduced in order to maintain constant surface speed of the tool 64 with respect to the surface being cut. The lowest rotational speed is at the edge of the contour cut, and speed increases until the center bore F is being cut by the cutting tool 64. As the tool 64 travels the distance of bore F, surface speed remains constant, as do the runout values.

After the final machining step the salvaged compressor housing 20 has a smooth, shiny machined contoured surface 52 like that shown in FIG. 6. The transitional band 54 typically is uncoated due to the machining away of any additional material that may have been laid down during the coating step, and so may also appear shiny. The relatively flat surface 56 may have a roughened texture resulting from the grit blasting and/or arc spraying steps, but this will not affect the performance of the turbocharger 10.

Tests

A series of tests and calculations were performed to optimize the salvaging process.

Machining Test 1

A compressor housing 20 was mounted on a lathe with a three-jaw chuck gripping the outside surface of the air inlet external port 38 at datums H and J. This method was found to be unsuitable for salvaging purposes because the runout tolerance for datums A and C with respect to datums H and J (0.13 mm) was approximately 2.5 times greater than the runout tolerance of the internal geometry of the compressor housing 20 with respect to datums A and C (0.05 mm)

Machining Test 2

A compressor housing 20 was mounted on a lathe with a three jaw chuck gripping the rear (sealing) surface 46 (datum A) of the compressor housing 20 and the interior surface 48 (datum C) of the annular ring 44. Each jaw was about two inches wide. A cutting tool was inserted through the air inlet external port 38 and the air inlet internal port 40 during the machining process.

This set up failed to provide a salvaged housing having acceptable runout tolerances (variance from the product specifications). Upon close examination, the cause was deformation in the compressor housing 20. Specifically, datum C, the internal diameter of the compressor housing rear annular ring 44, had varying degrees of deformation as a result of normal turbocharger operation. For example, in one experiment the diameter of the annular ring 44 was found to vary from a low of 209.460 mm to a high of 209.640 mm, a difference of 0.18 mm. It was theorized that this was at least partly due to a creep phenomenon that occurs due to the over-aging of the aluminum alloy at elevated temperatures in conjunction with loading due to gravity and the attached mechanical components.

With this level of annular ring deformation, the original center axis (G) of the compressor housing 20 determined by datum C could not be calculated. Performing the machining operation on a compressor housing 20 having this level of deformation with a three jaw the chuck in which each jaw was two inches wide resulted in an increase in runout of the machined contoured surface 52 to unacceptable levels.

Machining Test 3

To overcome this deformation problem, a new chuck 58 with enlarged, pie shaped chuck jaws 66 was used in order to maximize the area of contact with the interior surface 48 of the annular ring 44, thereby reducing the sensitivity of the machining process to annular ring deformation. In this setup, shown in FIG. 12, the jaws 66 contacted about 340 degrees of the annular ring 44, although 270 degrees or more is operable. Because of the irregular shape of the compressor housing 20 (due in large part to the compressed air outlet port 42) a counterweight 62 was attached to the chuck 58 approximately 180 degrees opposite the air outlet port 42.

Inspection of the machined housings 20 on a coordinate measuring machine (CMM) revealed that some machined housings 20 still exhibited a runout greater than print specifications. It was theorized that, due to the deformation of the pilot bore during normal operation, the original center axis (G) of the housing 20 as determined by the pilot bore (C) was no longer accurate, which could bias the CMM results.

Figure 14:
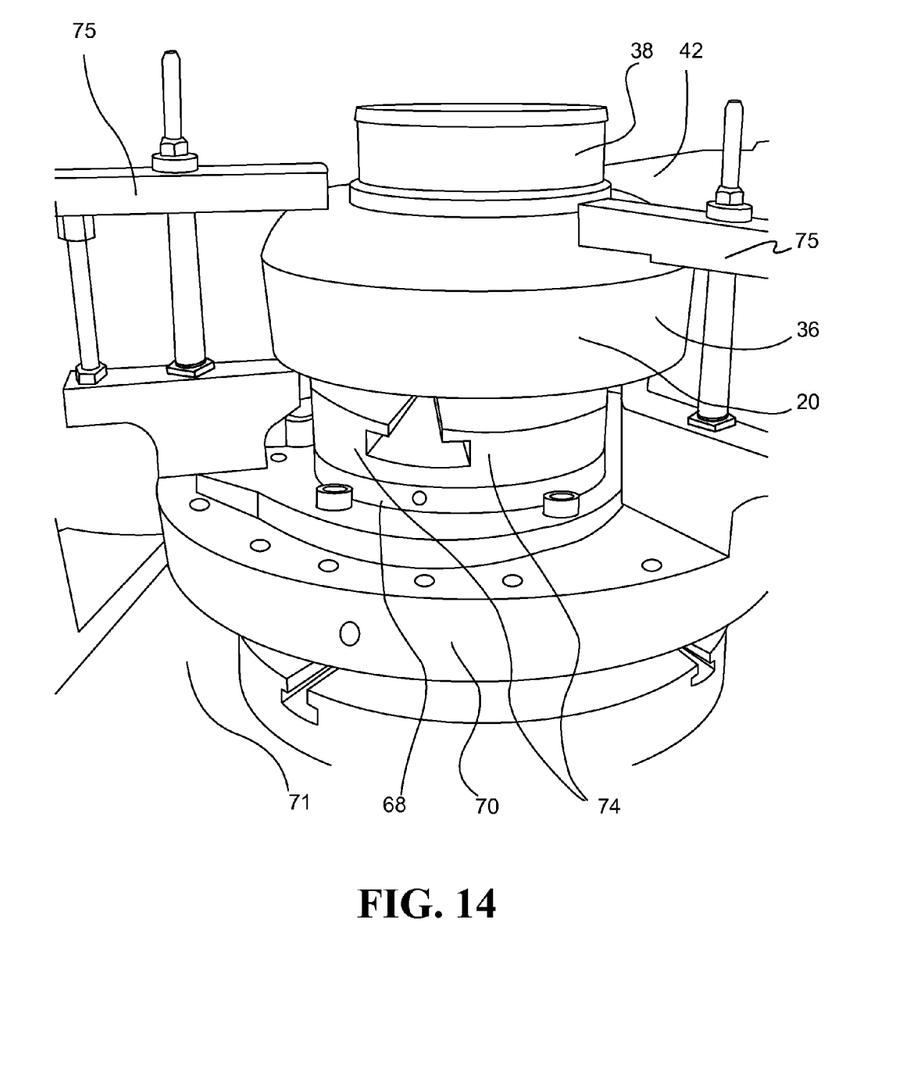
FIG. 14 is a view of a compressor housing mounted in a lathe chuck used to machine the compressor housing, shown with optional clamps.

As a result of these and other tests it was determined that the machining steps of the salvaging process are best accomplished using a diaphragm chuck like the diaphragm chuck 68 shown in FIG. 14. The diaphragm chuck 68 may be mounted on a lathe turret 60 like that shown in FIG. 12. Before the machining steps, the damaged compressor housing 20 is positioned on the diaphragm chuck 68 using the key datums A and C, the two positioning references to which all of the geometry related to the salvage process is referenced, and the datums to which the existing geometry machined on the interior side of the housing are referenced. Datums A and C also allow for the determination of the axial center line G of the compressor housing 20.

The compressor housing 20 is mounted on the diaphragm chuck jaws 74 so that the jaws 74 abut the compressor housing rear surface 46 (datum A) and extend within the rear opening of the compressor housing 20. The jaws 74 are then expanded outwardly to fit against and grip the annular interior surface 48 of the annular ring 44 (datum C). Contacting as much of the interior as possible with the chuck jaws 74 reduces sensitivity to the deformation of the annular ring 44 that can occur during normal usage of the compressor housing 20. The cutting tool 64 is inserted through the air inlet external port 38 and the air inlet internal port 40 for machining the interior (performance) surface 50 of the compressor housing 20. (See FIG. 12.)

Any suitable diaphragm chuck may be used, such as those available commercially from Ultra-Grip International of Detroit Mich. Preferably the gripping surface of the chuck jaws is as close to 360 degrees as possible to reduce sensitivity of annular ring 44 deformation during the machining process. For example, in a six jaw diaphragm chuck 68, each jaw 74 should have a gripping surface of at least 45 degrees for a minimum total gripping surface of 270 degrees and preferably about 340 degrees.

The rotational speed of the compressor housing 20 during machining was found to effect runout. Increasing the rotational speed during the machining steps increases the weight imbalance caused primarily by the compressed air outlet port 42. As rotational speed increases, the force exerted by the imbalanced mass of the compressed air outlet port 42 increases.

Evidence of the increasing imbalance is seen when comparing runout values for the same housings at two different speeds. In one test, after the pre-spray machining step and before the spraying step, runout was measured with respect to an inscribed circle along the contoured surface 52 of the compressor housing 20. At a machining speed of 800 RPM the runout along numerous locations varied between 0.145 mm and 0.020 mm. At a machining speed of 400 RPM the runout along numerous locations varied between 0.085 and 0.015.

This imbalance may be offset on the entire rotating assembly of the lathe, diaphragm chuck 68, and compressor housing 20 by attaching a counterweight 62 to the diaphragm chuck 68, allowing for the assembly to rotate smoothly. However, even with the counterweight 62, the force exerted within the structure of the compressor housing 20 increases as rotational speed increases, causing dynamic deformation within the housing 20.

Figure 13:
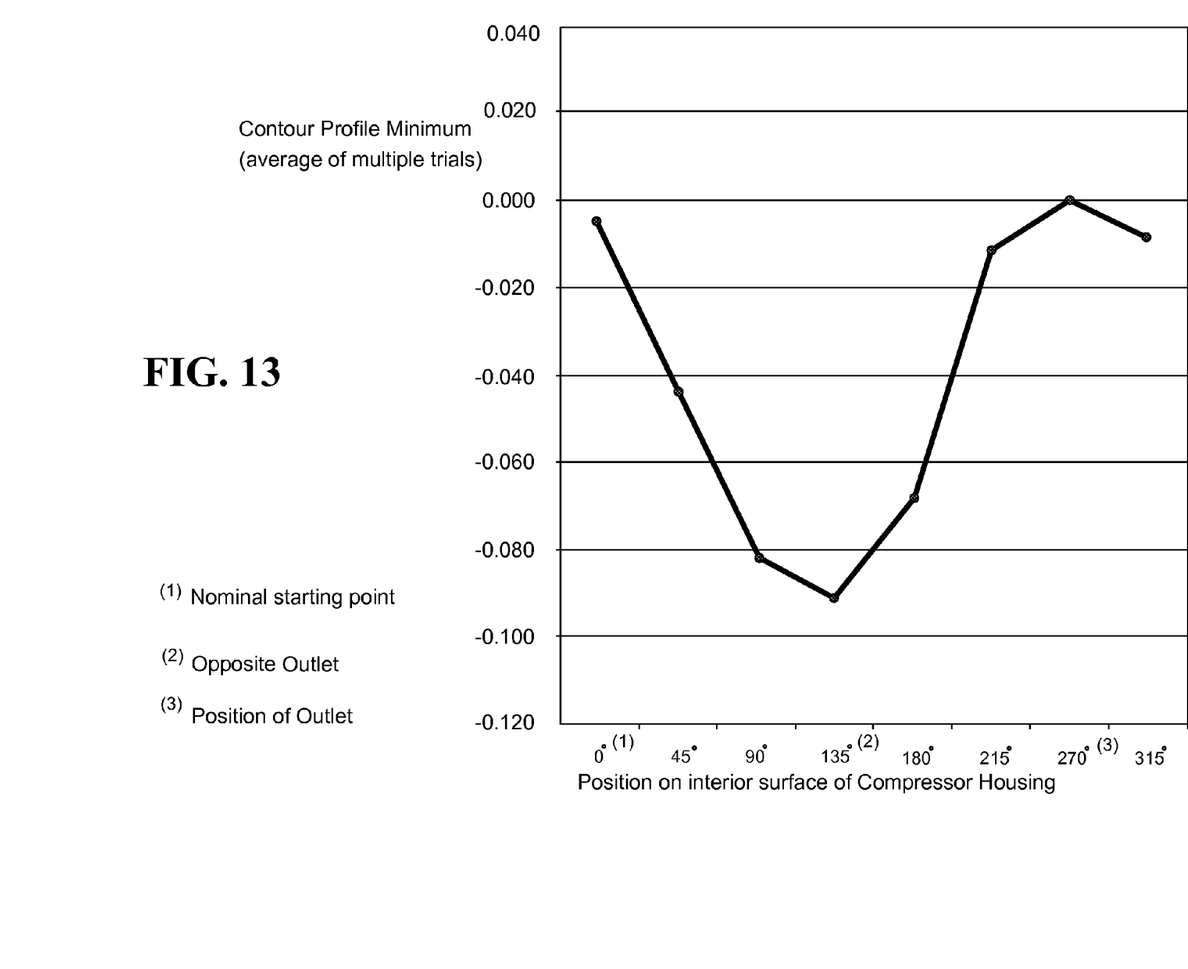
FIG. 13 is plot of minimum material location versus angular position in a machined compressor housing.

The effect of deformation on runout is seen graphically in the plot of minimum material location versus angular position shown in FIG. 13 which is a plot of the contour profile minimum taken every 45 degrees from a nominal starting point along a circle located on the interior surface 50 of the housing 20. Location 4 in the plot corresponds to a spot opposite the compressed air outlet port 42 and location 7 corresponds to the position of the compressed air outlet port 42. As indicated in FIG. 13, the most amount of material removed from the interior surface during machining consistently occurred at location 4, the spot opposite the compressed air outlet port 42. The problem got worse as the rotational speed of the housing increased. Conversely, the least amount of material was removed at location 7, near the position of the compressed air outlet port 42. This data suggests that the compressed air outlet port 42 is elastically deforming the housing 20 and pulling it into the cutting tool when the outlet 42 is opposite the cutting tool, and pulling the housing away from the cutting tool when the compressed air outlet port 42 is in the same angular position with the cutting tool. The effect increases as rotational speed increases due to the force exerted by angular acceleration, thereby setting a limiting rotational speed for a given housing 20. Larger housings 20 will have lower limiting speeds while smaller housings 20 will have higher limiting speeds.

For the compressor housings used in testing, it was determined that the rotational speed of the compressor housing 20 should be kept at less than about 800 RPM and preferably less than about 400 RPM to achieve acceptable runout. Of course, operable rotational speed will vary according to the size and configuration of the compressor housing.

Keeping the rotational speed of the housing under 800 RPM and even under 400 RPM does not pose a problem during the pre-spraying machining step because a millimeter of material can be removed in a single pass. However, it takes more passes to remove material—mainly excess coating) during the final machining step because removal is limited to about 0.05 mm per pass.

FIG. 14 is a view of a compressor housing 20 mounted in a lathe chuck 68 used to machine the compressor housing 20. Optionally, one or more holding clamps 75 may be used to help hold the compressor housing 20 to the lathe chuck 68 during the machining steps. The holding clamps 75 ensure that there is no relative motion between the compressor housing 20 and the chuck 68 due to the increasing imbalance caused by the compressed air outlet port 42 at high rotational speeds. For example, three holding clamps 75 may be clamped to the housing body 36 at intervals of about 120 degrees. As already noted above, after salvaging a compressor housing 20, runout may be measured to provide assurance that the salvaged housing 20 meets specifications and that runout compliance is acceptable. FIG. 14 shows a salvaged compressor housing 20 mounted on an inspection fixture prior to being measured for runout. The inspection fixture comprises a diaphragm chuck 68, an air bearing 70 and an inspection table 71. In FIG. 14 the salvaged compressor housing 20 is shown positioned vertically with its air inlet external port 38 pointing up and held by a six jaw diaphragm chuck 68 like that used during the machining steps. The diaphragm chuck 68 mounted on air bearing 70 resting on the inspection table 71.

The compressor housing 20 may be held in the same manner during runout inspection as during machining. A duplicate of the six jaw diaphragm chuck 68 used for the machining steps may be used, with the jaws 74 extending into the rear opening of the housing 20 to hold the housing 20 and provide contact with at least 270 degrees and preferably closer to 340 degrees of the interior surface 48 of the annular ring 44. The chuck jaws 74 expand to fill out the rear opening of the compressor housing 20, with the mating surfaces of the jaws 74 pressing against the interior surface 48 of the annular ring 44. As the compressor housing 20 is slowly rotated, a stationary runout gage (not shown) measures the runout along a circular path along the interior surface 50. (Runout can also be measured in a similar fashion while the compressor housing is still mounted on the lathe.)

For one set of compressor housings 20 used in testing, the print specification for the air inlet internal port diameter (F) was 75.77+/−0.08 mm. It was decided to limit the salvageable housings to those having air inlet internal port diameters (F) falling within the upper half of this range, calculated to be 75.81+/−0.04 mm. The additional, unused 0.08 mm of diametrical tolerance translates to 0.04 mm of radial clearance between the compressor housing 20 and the compressor impeller 14. Additionally, engineering analysis determined that the radial clearance of the compressor housing 20—the gap between the compressor impeller 14 and the housing interior surface 50—could be increased by another 10 μm, or 0.01 mm. Thus the additional contour runout for the print specification was calculated to be 0.05 mm (0.04 mm+0.01 mm), or a maximum of 0.10 mm across the entire diameter (F) and the interior surface 50. After salvaging a sampling of twenty-four (24) housings it was determined that a runout tolerance of 0.10 mm for the air inlet diameter (F) could be achieved. Thus, by using less than half the tolerance range (75.81+/−0.04 mm) to obtain a slightly higher clearance, the runout specification on salvaged housings was doubled to a maximum of 0.10 mm from a maximum of 0.05 mm.

INDUSTRIAL APPLICABILITY

Thus a method of salvaging a turbocharger compressor housing has been described that allows operators to re-use turbocharger housings that otherwise would have to be scrapped because of scratches and other damage. The re-use of salvaged turbocharger compressor housings has the potential to reduce operator costs and reduce the demand for new housings for remanufactured turbochargers. The techniques described herein may also have applicability in the area of cast iron compressor housings and turbine housings.

It is understood that the embodiments of the disclosure described above are only particular examples which serve to illustrate the principles of the disclosure. Modifications and alternative embodiments of the disclosure are contemplated which do not depart from the scope of the disclosure as defined by the foregoing teachings and appended claims. It is intended that the claims cover all such modifications and alternative embodiments that fall within their scope.

The invention claimed is:

1. A method for salvaging a used turbocharger compressor housing, the compressor housing defining an axial line G and comprising a body having an interior surface, a substantially cylindrical air inlet external port extending axially and forwardly from the body, a substantially cylindrical air inlet internal port extending axially and forwardly from the body and being substantially concentric with the air inlet external port, the air inlet internal port defining an internal diameter F, a compressed air outlet port extending roughly tangentially from the body, and an annular ring extending substantially axially and rearwardly from the body, the annular ring having a substantially flat rear surface and a substantially cylindrical interior surface, the method comprising the steps of:
   (a) mounting the compressor housing on a lathe chuck having chuck jaws abutting the substantially flat rear surface of the annular ring and contacting at least 270 degrees of the substantially cylindrical interior surface and removing original base material from the interior surface to a substantially uniform depth by reaching through the air inlet internal port with a cutting tool while rotating the compressor housing to produce a machined portion of the interior surface;
   (b) grit blasting the machined portion to produce a grit blasted area;
   (c) coating the grit blasted area with a metalized coating to a depth exceeding operating specifications; and
   (d) mounting the compressor housing to a second lathe using a chuck having chuck jaws abutting the substantially flat rear surface and the substantially cylindrical interior surface of the annular ring and machining the interior surface with a cutting tool inserted into the compressor housing through the air inlet internal port while the compressor housing is rotated about the axial line G to remove a portion of the metalized coating, thereby restoring the interior surface of the compressor housing to the operating specifications.

2. The method of claim 1 comprising the additional step of:
   (e) measuring runout by mounting the compressor housing on an inspection fixture comprising a chuck having jaws that abut the compressor housing rear surface and extend within the rear opening of the compressor housing to abut the annular ring, and measuring the runout along a circular path with a stationary runout gauge while slowly rotating the compressor housing.

3. The method of claim 2 wherein during step (e) the compressor housing is positioned vertically with the air inlet external port pointing up and held by a six jaw diaphragm chuck mounted on an air bearing resting on an inspection table.

4. The method of claim 1 wherein prior to step (b) the compressor housing is moved to a grit blasting cell, and wherein during the grit blasting step an abrasive media is directed at the machined portion of the interior surface.

5. The method of claim 1 wherein during step (c) the metalized coating is applied using a wire arc spray gun while the compressor housing is chuck mounted on a rotatable turntable.

6. The method of claim 1 wherein the interior surface comprises a bell shaped contoured surface, a relatively flat surface and a transitional band interposed between the contoured surface and the relatively flat surface, and wherein during step (c) at least a portion of the contoured surface and at least a portion of the transitional band are coated.

7. The method of claim 1 wherein the metalized coating is applied in a thickness at least 0.25 mm thicker than the operating specifications.

8. The method of claim 1 wherein during step (d) the second lathe chuck is the same lathe chuck used during step (a).

9. The method of claim 1 wherein during step (d) the portion of the metalized coating is removed during multiple passes of the cutting tool, with no more than about 0.05 mm thickness of the metalized coating removed with each pass.

10. The method of claim 1 wherein during step (d) the rotational speed of the chuck changes in response to the distance between the cutting tool and the axial line G to maintain a constant surface speed of the cutting tool with respect to the surface being machined.

11. The method of claim 1 wherein the chuck used during step (d) comprises jaws that contact at least 270 degrees of the interior surface of the annular ring.

12. The method of claim 1 wherein during steps (a) and (d) a counterweight is attached to the chuck approximately 180 degrees opposite the compressed air outlet port.

13. The method of claim 1 wherein the chuck used during step (d) is a diaphragm chuck and the chuck jaws abut the compressor housing rear surface and extend within the rear opening of the compressor housing to abut the annular ring.

14. The method of claim 1 wherein during step (d) the compressor housing is rotated at a speed of less than about 800 RPM.

15. The method of claim 1 wherein during step (d) the compressor housing is rotated at a speed of less than about 400 RPM.

16. The method of claim 1 wherein step (d) includes securing the compressor housing to the chuck with two or more holding clamps located around the compressor housing at spaced apart intervals.

17. The method of claim 1 wherein the air inlet internal port diameter F has an original operating specification range, and wherein the method is limited to used compressor housings having an air inlet internal port diameter F that falls within the upper half of the original operating specification range.

18. The method of claim 1 wherein the original operating specification range for the air inlet internal port diameter F is 75.77+/−0.08 mm, and wherein the method is limited to used compressor housings having air inlet internal port diameters F that fall within the range of 75.81+/−0.04 mm.

19. A method for salvaging a used turbocharger compressor housing, the compressor housing defining an axial line G and comprising a body having a bell shaped contoured surface containing imperfections resulting from contact with a turbocharger impeller, a substantially cylindrical air inlet external port extending axially and forwardly from the body, a substantially cylindrical air inlet internal port extending axially and forwardly from the body and being substantially concentric with the air inlet external port, the air inlet internal port defining a diameter F, a compressed air outlet port extending roughly tangentially from the body, and an annular ring extending substantially axially and rearwardly from the body, the annular ring having a substantially flat rear surface defining a datum A and a substantially cylindrical interior surface defining a datum C, the method comprising the steps of:
   (a) mounting the compressor housing on a rotatable lathe using a diaphragm chuck having chuck jaws abutting the datum A and at least 270 degrees of the datum C and removing original base material from the bell shaped contoured surface by reaching through the air inlet internal port with a cutting tool while rotating the compressor housing to produce a machined portion of the interior surface;
(b) grit blasting the machined portion to produce a grit blasted area;
(c) coating the grit blasted area with a metalized coating to a depth exceeding operating specifications; and
(d) mounting the compressor housing on a second rotatable lathe using a diaphragm chuck having chuck jaws abutting the datum A and at least 270 degrees of the datum C and final machining the bell shaped contoured surface with a cutting tool inserted into the compressor housing through the air inlet internal port while the compressor housing is rotated about the axial line G at a speed not exceeding 800 RPM to remove a portion of the metalized coating.

* * * * *